Figure 1:
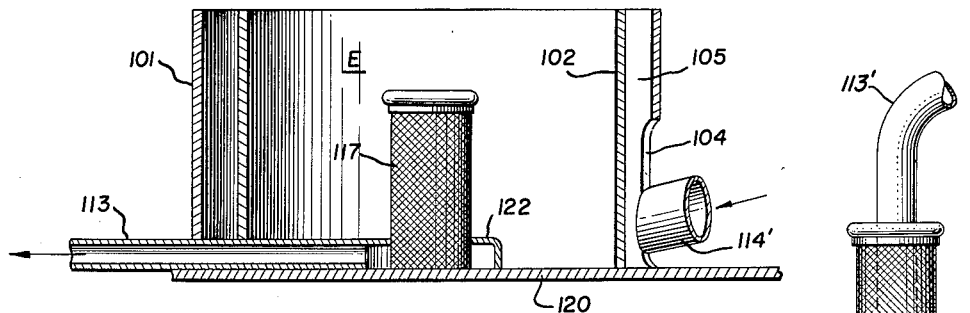

Feb. 13, 1962  H. SCHRAIVOGEL  3,020,950
FUEL TANK CONSTRUCTION, ESPECIALLY FOR MOTOR VEHICLES
Filed Nov. 10, 1959

INVENTOR.
HORST SCHRAIVOGEL
BY Dicke, Craig and Freudenberg
ATTORNEYS

United States Patent Office 3,020,950
Patented Feb. 13, 1962

3,020,950
FUEL TANK CONSTRUCTION, ESPECIALLY FOR MOTOR VEHICLES
Horst Schraivogel, Stuttgart, Germany, assignor to Daimler-Benz Aktiengesellschaft, Stuttgart-Unterturkheim, Germany
Filed Nov. 10, 1959, Ser. No. 852,072
Claims priority, application Germany Nov. 19, 1958
7 Claims. (Cl. 158—46)

The present invention relates to a further development and improvement in the construction and arrangement of a collecting and storing device in the form of a double-walled housing disposed within the fuel tank for an internal combustion engine, especially for an injection type engine of a motor vehicle provided with a centrally arranged housing forming a fuel-storage space adapted to dam-up or collect and store therein some of the fuel present in the tank, especially at low fuel levels, which collecting and storing device is thereby located at the tank bottom directly ahead of the fuel inlet line or connecting piece thereof, and is possibly provided also with a filter, of the type described in the copending application Ser. No. 806,347, which has the same assignee as the present application and was filed April 14, 1959, in the name of Willi Neuerburg et al., entitled "Fuel Tank Construction." The subject matter of application Serial No. 806,347 is incorporated into the instant application insofar as necessary.

As pointed out in the aforementioned copending application, installations are known in the prior art for use in fuel tanks of internal combustion engines which serve the purpose of damming-up, collecting and storing, especially with a relatively low fuel level in the tank, the fuel present within the tank during braking and acceleration as well as during curve drives. These prior art devices thereby dam-up, collect and store the fuel within the region of the fuel outlet or discharge line, and are used, for example, in the form of relatively low partition walls extending in a transverse direction of the fuel tank and secured to the tank bottom ahead and/or behind the discharge line. With such an installation, fuel under the influence of accelerating and decelerating forces is effectively dammed-up and collected by these partition walls.

Other prior art arrangements are known in which an S-shaped, vertically extending guide sheet metal strip is provided above the outlet or discharge in the fuel tank at the bottom thereof, whereby the fuel which runs off along the outer leg portions of the S-shaped strip is dammed-up and is thereby effectively conducted to the fuel outlet or discharge.

Furthermore, fuel tank constructions are known in the prior art, the inner space of which is subdivided in an S-shaped manner by means of sheet metal walls whereby an outlet is provided in each individual space. Additionally, it is known to form such S-shaped subdivisions by means of anti-roll baffle plates also provided with a large number of small apertures.

It is also known in the prior art to arrange an anti-roll baffle box about the fuel supply line with the four side walls of the baffle box rigidly connected with the fuel bottom, which is thereby provided with apertures in proximity to the fuel bottom to enable therethrough the flow of fuel.

All of these prior art installations mentioned hereinabove, however, exhibit for the most part considerable shortcomings and disadvantages, as also pointed out more fully in the aforementioned co-pending application.

For example, no definite assurance is given by the use of the particular damming-up walls and/or guide walls known in the prior art which are arranged only transversely to the driving direction, that a sufficient supply of fuel for the internal combustion engine is provided reliably under all possible driving conditions. Since it can be safely assumed that under normal driving conditions more accelerating forces for the fuel occur which are directed in the transverse direction of the vehicle, in the form of centrifugal forces, than in the longitudinal direction of the vehicle, in the form of accelerating or decelerating forces, by reason of the more frequent occurrence of curve drives than accelerations and decelerations, then, with the prior art installations, oftentimes no appreciable damming-up of the fuel or none at all takes place with the occurrence of centrifugal forces to assure a safe and reliable supply of fuel.

Additionally, as also pointed out in the aforementioned copending application, there exists also the danger that the fuel will flow out of the immediate vicinity of the fuel outlet with the prior art constructions utilizing individual baffle plates provided with small connecting passages, not to mention the high constructional cost and expenses necessitated by such prior art installations.

The particular damming-up, collecting and storing arrangement according to the aforementioned copending application, which is assigned to the assignee of the present application, is intended to obviate all of the aforementioned shortcomings and disadvantages of the prior art constructions, and essentially consists of a damming-up and storage housing having an outer curved wall and an inner curved wall forming therebetween a spiral-shaped inlet channel for the fuel in communication at the outer end thereof, with the inside of the fuel tank, and in communication at the inner end thereof with the inside of the storing housing. Additionally, the aforementioned copending application proposes to provide a return of the excess fuel from the injection pump through a return line which extends essentially tangentially to the inner wall of the housing in the direction toward the inner spiral end and thereby discharges the excess fuel directly into the inner housing space of the storage housing.

The present invention which constitutes a further improvement over the aforementioned copending application essentially consists in discharging the excess fuel returned from the injection pump by means of the fuel return line essentially tangentially into the inlet of the storage space. This particular arrangement offers the advantage that the fuel quantity discharged from the fuel return line has to traverse a relatively longer path to the actual damming-up and storage space and that the immediate encounter and therewith the direct mixing of the excess fuel returned through the return line with the fuel quantity present in the storage space is prevented thereby. Both of these factors contribute to a relatively rapid quieting and therewith to an improved defoaming and degassing of the fuel. Furthermore, the present invention also enables a practically complete consumption of the fuel tank content.

Accordingly, it is an object of the present invention to provide a collecting and storing arrangement within a fuel tank which entails all of the advantages obtainable with the construction mentioned in the aforementioned copending application and which additionally assures improved operation of the vehicle and a complete consumption of all the fuel present in the tank.

Another object of the present invention is the provision of a construction for a storing device within a fuel tank which contributes considerably to the defoaming of the return fuel and the removal of any gases present therein.

Another object of the present invention resides in the provision of a collector and storage construction within the fuel tank for an internal combustion engine, particularly for a fuel injection combustion engine operating with a fuel supply pump and with a fuel injection pump in which the fuel sucked into the injection pump in excess of the required amount which is returned to the fuel tank through the return line is effectively defoamed and degassed before being made available again for supply to the supply and injection pump.

Figure 3:
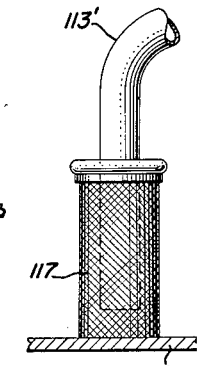
Figure 2:
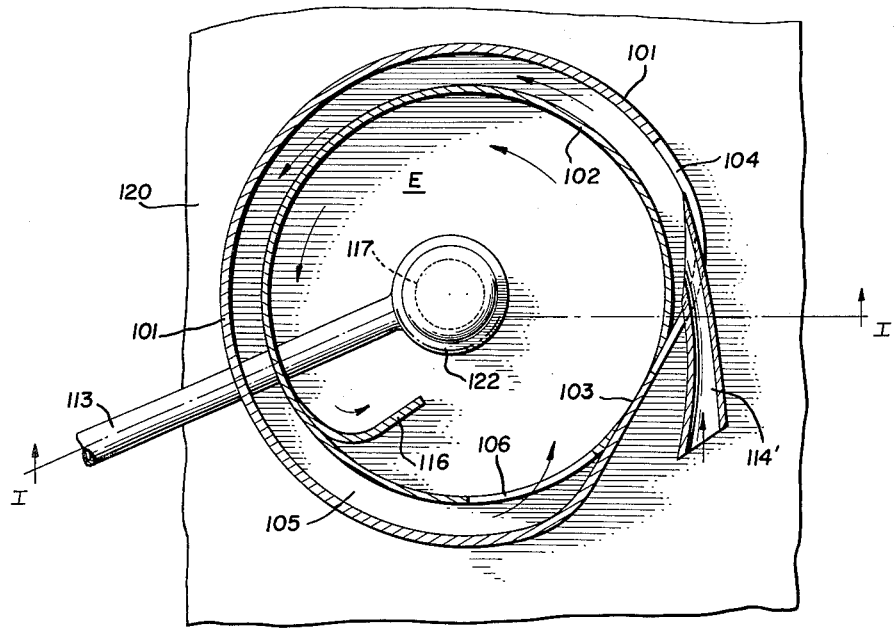

These and otther objects, features and advantages of the present invention will become more obvious from the following description when taken in connection with the accompanying drawing which shows, for purposes of illustration only, one embodiment in accordance with the present invention and wherein:

FIGURE 1 is an axial elevational cross-sectional view of a fuel collecting and storage device in accordance with the present invention taken along suction line I—I of FIGURE 2, FIGURE 2 is a plan view of the device illustrated in FIGURE 1, and FIGURE 3 illustrates a modified form of the suction intake for the device in accordance with the present invention.

Referring now to the drawing wherein like reference numerals are used throughout the two views thereof to designate corresponding parts, reference numeral 120 designates the bottom of the fuel tank. The fuel damming-up, collecting and storing housing 102 is arranged essentially centrally within the fuel tank at the fuel tank bottom 120 and is open at the top thereof. The damming-up or collecting space E is enclosed by the inner cylindrical housing wall 102. An outer cylindrical housing wall 101 which surrounds concentrically the inner wall 102 over most of the circumference of the damming-up space E terminates essentially tangentially at the inner housing wall 102 with the inwardly bent portion 103 thereof (FIGURE 2). The two housing walls 101 and 102 thereby define an outer essentially annularly-shaped space 105 constituting the inlet channel for the fuel which as viewed in the direction of flow of the fuel indicated in FIGURE 2 by the arrows is in communication with the damming-up space E through an aperture 106 provided within the inner wall 102 and located directly ahead of the flattened portion 103 of the outer wall 101 and which is in communication with the main space of the fuel tank through an aperture 104 provided within the outer wall 101 directly behind the flattened portion 103 of the outer wall 101. A baffle plate 116 extends inwardly into the space E at some distance ahead of the aperture 106 from the inner side of the housing wall 102, and more particularly approximately tangentially with respect to a centrally arranged filter 117.

An annular channel 122 which is open toward the filter member 117 extends around the base portion of the filter 117. A fuel suction or intake line 113, for example, leading to the fuel supply pump branches off from the annular channel 122. A modified arrangement of the fuel suction line for the fuel supply pump of the present invention is illustrated in FIGURE 3. As illustrated a fuel suction line 113' enters into the filter 117 through the top thereof and is vertically arranged within the filter terminating adjacent the bottom thereof.

According to the present invention, the return line 114' for the excess fuel discharges, especially within the region of the aperture 104, essentially tangentially into the outer inlet space 105. As a result of this arrangement, the fuel returning through the return line 114' is forced to follow a relatively longer flow path through the space 105 from the discharge aperture of line 114' to the aperture 106 along which any gas bubbles or foam that may be present in the fuel will have an opportunity to leave the fuel and thereby are effectively removed from the fuel already prior to the discharge thereof into the storage space E. Since the quantity of fuel already present in the storage space E is not directly ruffled by the returning fuel flow, the further defoaming and degassing action of the fuel is thereby favorably affected also within the storage space E. The fuel flows from the space E through the filter 117 into the annular channel 122 from which the fuel is drawn in through inlet line 113 as illustrated in FIGURE 1 or alternatively, when the construction of FIGURE 3 is considered, through inlet line 113'. The last remaining residual gas particles within the fuel are effectively removed from the fuel in the annular channel 122 whereas the last remaining foam bubbles are effectively retained by the thin mesh filter 117 so as to complete the defoaming and degassing action.

While I have shown and described one embodiment in accordance with the present invention, it is understood that the same is not limited thereto but is susceptible of many changes and modifications within the spirit and scope of the present invention, for example, by application to the various modifications described and shown in the aforementioned copending application; and I, therefore, do not wish to be limited to the details shown and described herein but intend to cover all such changes and modifications as are encompassed by the scope of the appended claims.

I claim:

1. In a fuel tank for internal combustion engines, especially motor vehicles, a damming-up, collecting and storage structure comprising wall means forming a storage space at the fuel tank bottom including inner and outer walls extending upwardly from said fuel tank bottom and forming therebetween an inlet channel having an essentially continuous curvature, said channel being open at one end thereof to provide a communication with the inside of the fuel tank, said inner wall being provided with an aperture near the other end of said channel to constitute a communicating passage between said channel and said storage space, fuel intake line means extending near the bottom of said storage space for the withdrawal of fuel from said space, and return line means for returning the excess fuel from said internal combustion engine terminating approximately tangentially in said inlet channel near said one end thereof.

2. In a fuel tank, the combination according to claim 1 wherein said return line means terminates within the region of the opening of said channel at said one end thereof.

3. In a fuel tank for internal combustion engines, especially motor vehicles, a damming-up, collecting and storage structure, comprising wall means forming an essentially centrally arranged storage space at the fuel tank bottom including inner and outer walls extending upwardly from the bottom of the fuel tank and forming therebetween an inlet channel having an essentially continuous curvature, said channel being open at one end thereof to provide a communication with the inside of the fuel tank, said inner wall being provided with an aperture near the other end of said channel to constitute a communicating passage between said channel and said storage space, fuel intake line means extending near the bottom of said storage space, filter means effectively disposed ahead of said fuel intake line means, and return line means for returning the excess fuel from said internal combustion engine terminating approximately tangentially in said inlet channel near said one end thereof.

4. In a fuel tank, the combination according to claim 3 further comprising annular channel means surrounding the base portion of said filter means and open toward the same, said fuel intake line means being operatively connected with said annular channel means.

5. In a fuel tank for internal combustion engines, especially motor vehicles, a damming-up, collecting and storing structure, comprising wall means and forming an essentially centrally arranged storage space at the fuel tank bottom including inner and outer walls extending upwardly with respect to said fuel tank bottom and forming therebetween an inlet channel having an essentially continuous curvature, said walls being arranged essentially concentrically with respect to each other over most of the periphery thereof and said outer wall having a non-concentric portion abutting against the inner wall to thereby effectively close said inlet channel at the point of abutment, said outer wall being provided with aperture means near one end of said channel to provide a communication with the inside of the fuel tank, said inner wall being provided with aperture means near the other end of said channel to provide a communicating passage between said channel and said storage space, fuel intake line means extending near the bottom of said storage space including filter means, and return line means for returning the excess fuel from said internal combustion engine terminating approximately tangentially in said inlet channel within the region of said first-mentioned aperture means.

6. An arrangement for damming-up, collecting and storing a quantity of fuel sufficient for the supply of an internal combustion engine during the occurrence of accelerating forces acting on the vehicle which is located essentially in the center of a fuel tank for an internal combustion engine, especially of a motor vehicle supplied with fuel from said fuel tank over a fuel supply line, comprising intake means leading to said fuel supply line and extending into said fuel tank in proximity to the tank bottom thereof, housing means arranged about said intake means and defining an inner space about said intake means, said housing means including wall means extending upwardly with respect to said fuel tank bottom and forming a communicating passage in the form of a channel, said channel terminating near one end thereof within the inner space of said housing means, the outer wall means of said channel being effectively closed at least laterally with the exception of inlet means to provide a communication between said channel and said fuel tank, and return line means for returning the excess fuel from the engine extending into said channel essentially tangentially in proximity to said inlet means.

7. An arrangement for damming-up, collecting and storing a quantity of fuel sufficient for the supply of an injection-type internal combustion engine during the occurrence of accelerating forces acting on the vehicle which is located essentially in the center of a fuel tank for an internal combustion engine, especially of a motor vehicle supplied with fuel from said fuel tank over a fuel supply line by means of pump means, comprising intake means including filter means leading to said fuel supply line and extending into said fuel tank in proximity to the tank bottom thereof, housing means arranged about said intake means and defining an inner space about said intake means, said housing means including wall means extending upwardly with respect to said fuel tank bottom and forming a communicating passage in the form of an essentially annularly-shaped channel, said channel terminating near one end thereof within the inner space of said housing means, the outer wall means of said housing means being effectively closed at least laterally with the exception of inlet means to provide a communication between said channel and the inside of said fuel tank, and a return line means for returning the excess fuel from the engine extending into said channel essentially tangentially within the region of said inlet means.

References Cited in the file of this patent
UNITED STATES PATENTS

| | | |
|---|---|---|
| 2,316,729 | Tryon | Apr. 13, 1943 |
| 2,705,053 | Morris | Mar. 29, 1955 |
| 2,767,736 | Lackinger | Oct. 23, 1956 |